United States Patent
Banno et al.

(10) Patent No.: US 11,565,659 B2
(45) Date of Patent: Jan. 31, 2023

(54) RAINDROP RECOGNITION DEVICE, VEHICULAR CONTROL APPARATUS, METHOD OF TRAINING MODEL, AND TRAINED MODEL

(71) Applicant: DENSO CORPORATION, Kariya (JP)

(72) Inventors: Yoshihisa Banno, Kariya (JP); Sho Takano, Kariya (JP); Masaaki Inoguchi, Kariya (JP); Keigo Hikida, Kariya (JP); Kazuaki Mawatari, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/063,120

(22) Filed: Oct. 5, 2020

(65) Prior Publication Data

US 2021/0101564 A1    Apr. 8, 2021

(30) Foreign Application Priority Data

Oct. 7, 2019   (JP) .............................. JP2019-184397

(51) Int. Cl.
  *G06V 20/56*    (2022.01)
  *B60S 1/08*    (2006.01)

(52) U.S. Cl.
  CPC ............ *B60S 1/0844* (2013.01); *G06V 20/56* (2022.01)

(58) Field of Classification Search
  CPC .......................... B60S 1/0844; G06K 9/00791
  See application file for complete search history.

(56) References Cited

U.S. PATENT DOCUMENTS

| 2005/0035926 A1* | 2/2005 | Takenaga .............. B60S 1/0818 345/8 |
| 2006/0243894 A1 | 11/2006 | Takenaga et al. |
| 2007/0272884 A1* | 11/2007 | Utida .................... B60S 1/0844 250/573 |
| 2008/0157704 A1* | 7/2008 | Ishikawa ............... B60S 1/0818 318/483 |
| 2014/0232868 A1 | 8/2014 | Schwarz et al. |

(Continued)

FOREIGN PATENT DOCUMENTS

| DE | 103 55 205 A1 | 7/2005 |
| JP | 2010-014494 A | 1/2010 |

(Continued)

*Primary Examiner* — Hesham K Abouzahra
(74) *Attorney, Agent, or Firm* — Posz Law Group, PLC

(57) ABSTRACT

A raindrop recognition device is configured to recognize a raindrop on a transparent panel. The raindrop recognition device includes a storage unit, an image input unit, and an image recognition unit. The storage unit stores a trained model that is a machine learning model trained using, as training data, images of the transparent panel with adhered raindrops and images of the transparent panel without adhered raindrops. Image data of the transparent panel taken by a camera is input to the input unit. The image recognition unit is configured to calculate a value representing a raindrop likeness of an object on the transparent panel in the image data by inputting the image data to the trained model. The trained model is trained by training data including images of the transparent panel with uniform background and images of the transparent panel with light source.

17 Claims, 7 Drawing Sheets

(56) References Cited

U.S. PATENT DOCUMENTS

| | | | |
|---|---|---|---|
| 2014/0347487 A1* | 11/2014 | Ahiad | G06V 20/588 |
| | | | 348/148 |
| 2015/0094908 A1 | 4/2015 | Hirota et al. | |
| 2015/0161457 A1* | 6/2015 | Hayakawa | H04N 13/106 |
| | | | 348/46 |
| 2017/0282690 A1* | 10/2017 | Kataoka | B60H 1/00785 |
| 2019/0019042 A1* | 1/2019 | Tanigawa | G06V 20/56 |
| 2019/0253584 A1 | 8/2019 | Sawada | |
| 2020/0094784 A1* | 3/2020 | Herman | G06V 10/82 |
| 2020/0210768 A1* | 7/2020 | Turkelson | G06V 40/50 |

FOREIGN PATENT DOCUMENTS

| | | |
|---|---|---|
| JP | 2014-211323 A | 11/2014 |
| JP | 2015-102883 A | 6/2015 |
| JP | 2016-173642 A | 9/2016 |
| JP | 2018-092525 A | 6/2018 |
| JP | 2019-029940 A | 2/2019 |
| JP | 2019-099008 A | 6/2019 |
| WO | 2018/167971 A1 | 9/2018 |

\* cited by examiner

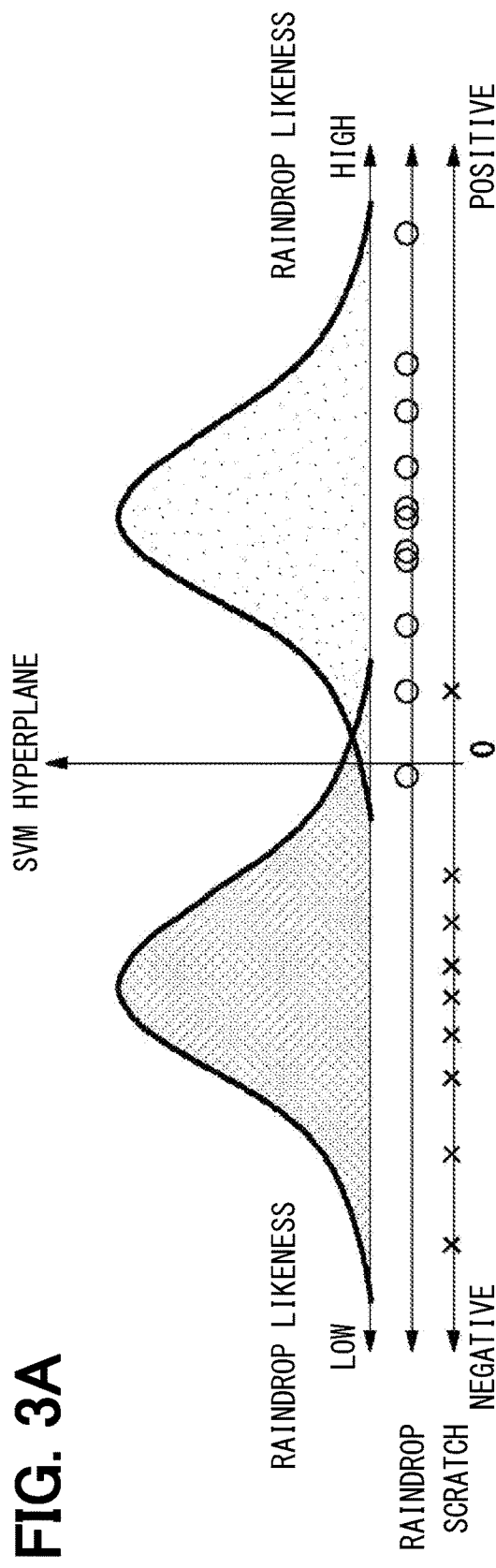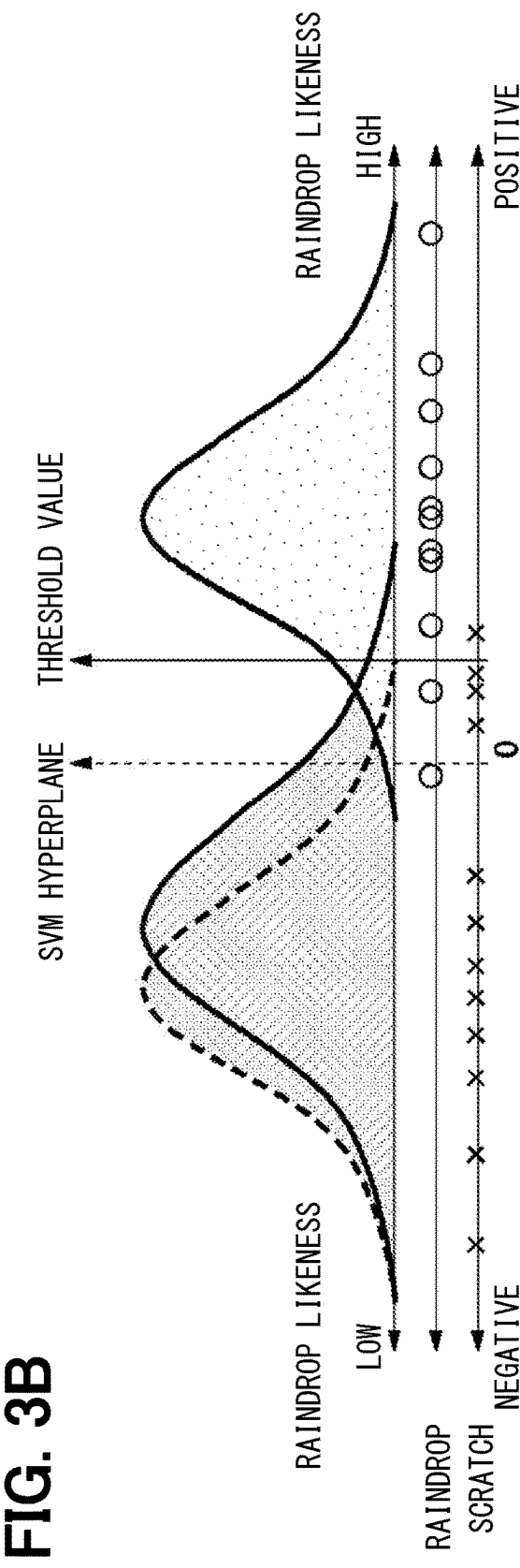

RAINDROP RECOGNITION DEVICE, VEHICULAR CONTROL APPARATUS, METHOD OF TRAINING MODEL, AND TRAINED MODEL

CROSS REFERENCE TO RELATED APPLICATION

This application is based on and incorporates herein by reference Japanese Patent Application No. 2019-184397 filed on Oct. 7, 2019.

TECHNICAL FIELD

The present disclosure relates to a device configured to recognize a raindrop on a transparent panel.

BACKGROUND

A general method of detecting an object adhered on a lens or a window of a vehicle using a camera has been proposed. The general method uses a recognizer trained with training data for recognizing a raindrop. Another general method detects an object on a glass surface based on a contour of the object and a brightness of the inside of the object.

The former method may erroneously recognize in some cases and cause unnecessary cleaning with a wiper, a washer, and the like. The latter method may be easily affected by an object in the background having a shape and a brightness similar to the detection target.

SUMMARY

A raindrop recognition device of an aspect of the present disclosure is configured to recognize a raindrop on a transparent panel. The raindrop recognition device includes: a storage unit storing a trained model that is a machine learning model trained using, as training data, images of the transparent panel with adhered raindrops and images of the transparent panel without adhered raindrops; an input unit to which image data of the transparent panel taken by a camera is input; and an image recognition unit configured to calculate a value representing a raindrop likeness of an object on the transparent panel in the image data by inputting the image data to the trained model. The trained model is trained by training data including images of the transparent panel with uniform background and images of the transparent panel with light source. The material of the transparent panel is not limited. The raindrop recognition device of the present disclosure can be used with a transparent panel made of glass, acrylic, polyethylene, polystyrene, or the like.

Another aspect of the present disclosure is a method of training a model for recognizing a raindrop on a transparent panel. The method includes: inputting training data each of which containing an image of the transparent panel and a label indicating whether a raindrop is on the transparent panel, the training data including images with uniform background and images with light source; and training the model by the training data.

Another aspect of the present disclosure is a trained model used in a computer for recognizing a raindrop on a transparent panel from an image of the transparent panel. The trained model has been trained by a method including: inputting training data each of which containing an image of the transparent panel and a label indicating whether a raindrop is on the transparent panel, the training data including images with uniform background and images with light source; and training the model by the training data.

BRIEF DESCRIPTION OF THE DRAWINGS

FIG. 3A is a diagram for explaining a process of determining whether an object is a raindrop based on a raindrop likeness.

FIG. 3B is a diagram showing a change of a distribution of scratches due to an external environment and a glass surface state.

DETAILED DESCRIPTION

Figure 1:
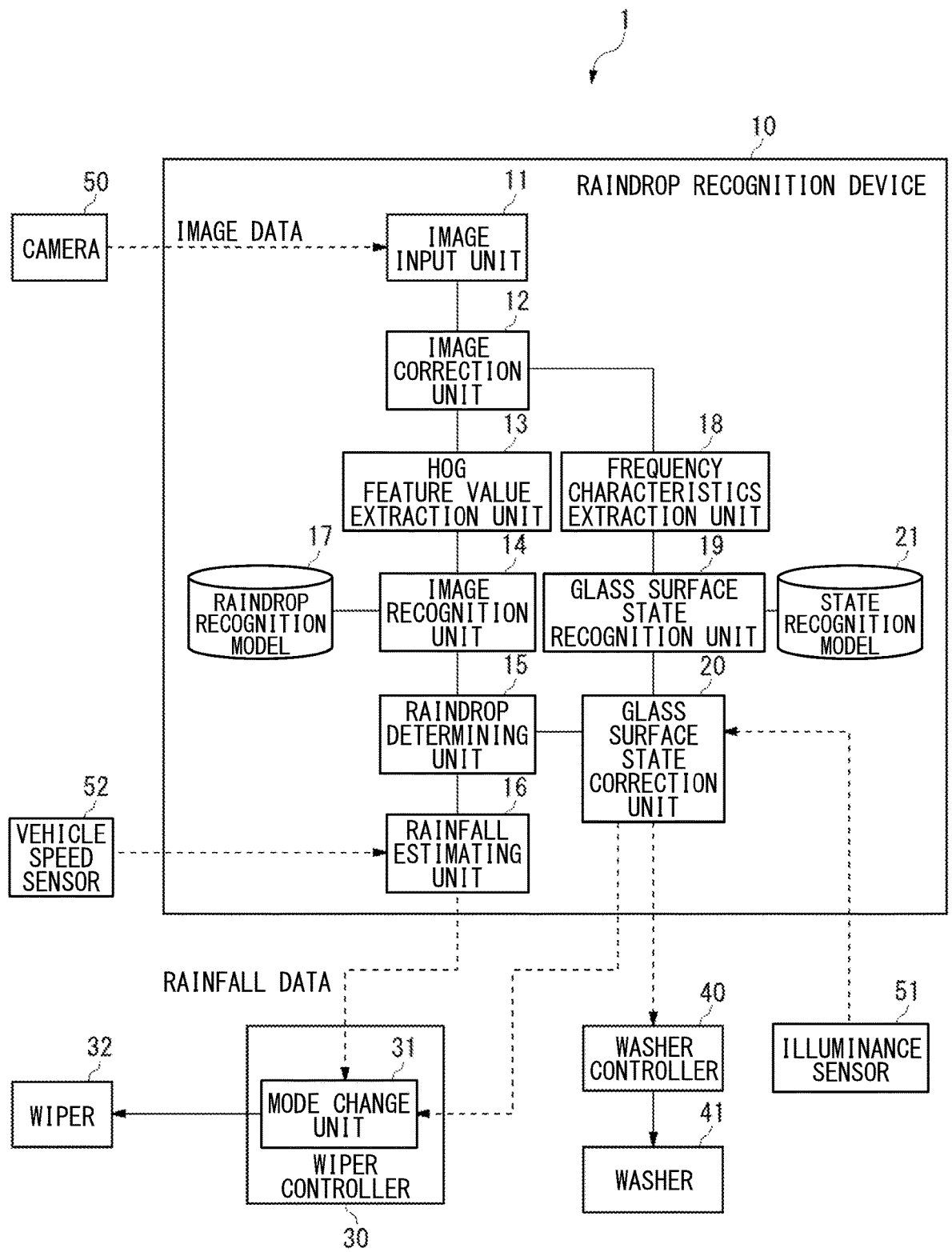
FIG. 1 is a block diagram illustrating a vehicular control apparatus including a raindrop recognition device.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Hereinafter, a raindrop recognition device according to embodiments of the present disclosure will be described with reference to the drawings. In the following descriptions, the raindrop recognition device is installed in a vehicle to recognize a raindrop on a windshield of the vehicle, for example. However, the raindrop recognition device of the present disclosure may be configured to recognize a raindrop on a transparent panel other than a windshield of a vehicle such as a glass surface of a building.

First Embodiment

FIG. 1 is a block diagram illustrating a vehicular control apparatus 1 including a raindrop recognition device 10. The vehicular control apparatus 1 includes the raindrop recognition device 10, a wiper controller 30, and a washer controller 40. The vehicular control apparatus 1 is configured to control a wiper 32 and washer 41 based on a recognition result by the raindrop recognition device 10. The wiper 32 and the washer 41 are shown in FIG. 1 as examples of in-vehicle devices particularly related to the raindrop recognition device 10, but other devices may be controlled.

The raindrop recognition device 10 is configured to recognize a raindrop adhered on a windshield of the vehicle. The raindrop recognition device 10 is configured to recognize the presence or absence, and a state (size and number) of the raindrop based on image data of the windshield taken by a camera 50.

Figure 2:
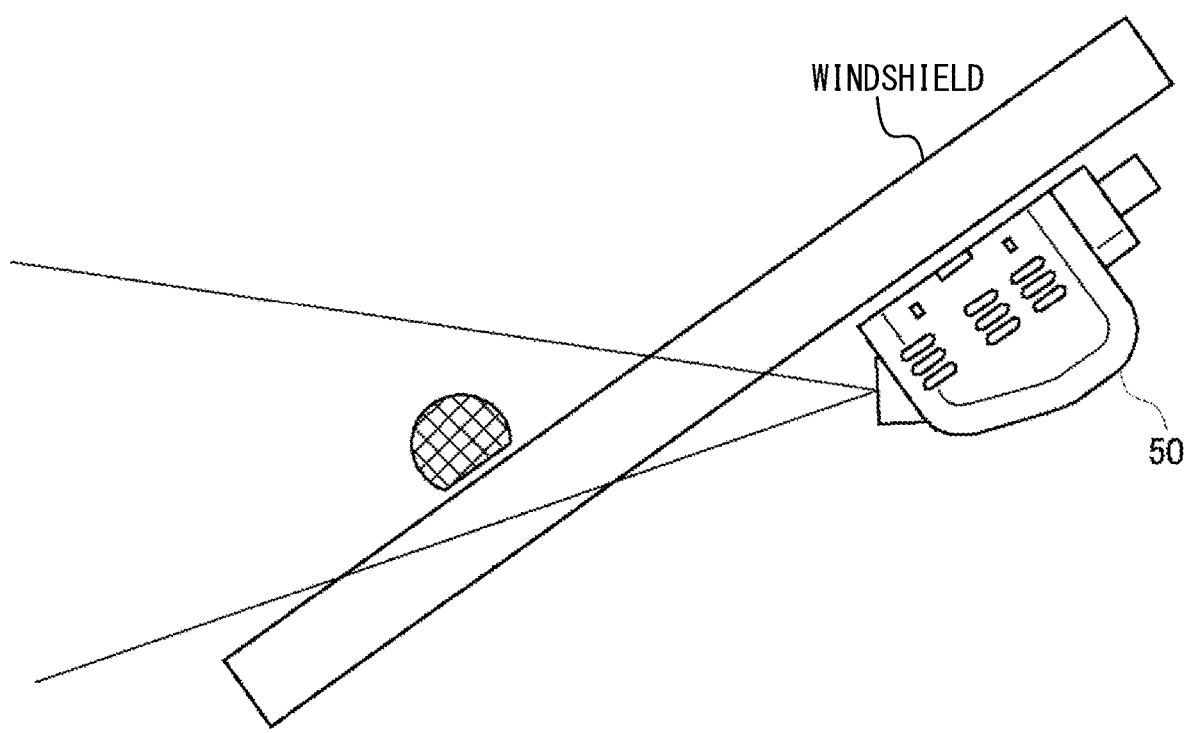
FIG. 2 is a diagram for explaining a position of a camera.

FIG. 2 is a diagram for explaining a position of the camera 50. The camera 50 is mounted on the windshield to take a picture from an inside of a passenger compartment.

The raindrop recognition device 10 includes an image input unit 11, an image correction unit 12, a HOG feature value extraction unit 13, an image recognition unit 14, a raindrop determining unit 15, and a rainfall estimating unit 16. The image data taken by the camera 50 is input to the image input unit 11. The image correction unit 12 is configured to perform a backlight correction (shading correction and the like) to the input image. When the input image is a backlit image, raindrops may not be detected, and dirt on the windshield may be erroneously detected as raindrops because the dirt reflects light.

The HOG feature value extraction unit 13 is configured to extract HOG feature value of the input image. The HOG is a feature of a contour and brightness gradient of an object in a local region of the image. The HOG is suitable for expressing a raindrop having a substantially circular shape in which the inverted background is reflected.

The image recognition unit 14 is configured to recognize the presence or absence, and a state of the raindrop from the HOG feature value of the input image. The image recognition unit 14 is coupled with a raindrop recognition model storage unit 17 that stores a trained model (hereinafter, referred to as a raindrop recognition model) for recognizing the presence or absence, and a state of raindrops from images of a glass surface. The raindrop recognition model is a machine learning model trained with images of the glass surface with raindrops and images of the glass surface without raindrops as training data. SVM (support vector machine) is used for learning in the present embodiment.

The HOG feature value extracted from the input image is a multidimensional vector having 100 to 1000 elements, for example. The HOG feature value extracted from the training data and the label of the training data are input to the SVM to learn weights of the elements for discriminating a raindrop from others, and the weights are stored as the trained model in the raindrop recognition model storage unit 17. The image recognition unit 14 is configured to read the raindrop recognition model from the raindrop recognition model storage unit 17 and obtain a value representing a raindrop likeness by inputting the HOG feature value of the input image into the raindrop recognition model.

The size and number of the raindrops can be determined by dividing the taken image into a grid and determining whether the image in each cell is a raindrop. For example, when adjacent cells are determined as a raindrop, the cells represent one raindrop, so the size of the raindrop can be determined.

The raindrop determining unit 15 is configured to determine whether a raindrop exists on a surface of the windshield by comparing the value representing the raindrop likeness with the hyperplane of the SVM. The hyperplane of the SVM is a threshold for determining whether an object is a raindrop. The threshold used in the raindrop determining unit 15 is changed based on an external environment and/or a state of the glass surface of the windshield. Here, configurations for determining the state of the glass surface will be described.

The raindrop recognition device 10 includes a frequency characteristics extraction unit 18, a glass surface state recognition unit 19, and a glass surface state correction unit 20. The frequency characteristics extraction unit 18 is configured to extract frequency characteristics of the image data using FFT. The image correction unit 12 changes the number of the pixels of the data of the input image into 2n×2n and pass the data to the frequency characteristics extraction unit 18. As a result, the image data becomes easier for the frequency characteristics extraction unit 18 to process by FFT.

The glass surface state recognition unit 19 is configured to detect a soaked state and/or a dirty state of the surface of the windshield based on the frequency characteristics of the image data. The glass surface state recognition unit 19 may be a transparent panel state recognition unit. The soaked state of the surface of a glass surface is a state where the entire surface is so wet that individual raindrops are not detected. The frequency characteristics of the whole input image or the frequency characteristics of a part of the input image may be used for detecting the state of the glass surface. The soaked state of the whole glass surface can be detected from the frequency characteristics of a part of the input image.

The glass surface state recognition unit 19 is configured to determine the state of the glass surface from the frequency characteristics of the image data using a multi-class SVM. A state recognition model is a trained model of multi-class SVM and is stored in a state recognition model storage unit 21. The glass surface state recognition unit 19 is configured to: read the state recognition model from the state recognition model storage unit 21; and input the data of the frequency characteristics of the image into the state recognition model to determine the class (e.g. entirely wet, dirty, normal, etc.) of the glass surface state.

The glass surface state correction unit 20 is configured to perform an external environment correction and a glass surface state correction to the state recognized by the glass surface state recognition unit 19. As the external environment correction, the threshold is changed such that the splash dirt and the like is detected with higher sensitivity when it is determined by an illuminance sensor 51 and the like that it is night, since the splash dirt and the like is hard to spot at night.

As the glass state correction, the threshold is adjusted when the backlight is detected, such that the scratches on the glass surface are not erroneously recognized as dirt due to the backlight. When the windshield made water repellent is wiped with the wiper, a white film may remain on the windshield. Accordingly, when the windshield is made water repellent, the determination after wiping may be ignored. Further, in order not to erroneously recognize fogging on the inside of the windshield as dirt, it may be determined whether the windshield would be fogged based on the detection results of the outside air temperature and the inside temperature.

The recognition process of the glass surface state has been described above. The raindrop determining unit 15 is configured to determine whether an object on the glass surface is a raindrop based on the glass surface state and the raindrop likeness determined by the image recognition unit 14.

FIG. 3A is a diagram for explaining a process of determining whether an object is a raindrop based on a raindrop likeness. In the present embodiment, it is determined whether an object is a raindrop by comparing the raindrop likeness and a threshold that is an SVM hyperplane for determining whether an object is a raindrop. In FIG. 3A, a graph whose peak is located on the right side of the SVM hyperplane shows a distribution of values of raindrop likeness of raindrops, and a graph whose peak is located on the left side of the SVM hyperplane shows a distribution of values of raindrop likeness of scratches on the windshield. It can be determined whether an object on the windshield is a raindrop or a scratch using the SVM hyperplane. The raindrop determining unit 15 is configured to determine whether an object on the windshield is a raindrop by comparing the raindrop likeness with the SVM hyperplane.

As shown in FIG. 3B, the distribution of the raindrop likeness of a scratch may change, due to the external environment and the glass surface state, to be closer to the distribution of the raindrop likeness of a raindrop. In this case, if the original SVM hyperplane is used for the determination, a scratch may be erroneously detected as a raindrop. The scratches represented by "x" located on the right side of the SVM hyperplane are erroneously detected as a raindrop. The raindrop determining unit 15 changes the threshold based on the recognition result of the glass surface state. In the example shown in FIG. 3B, the threshold for determining whether an object is a raindrop or a scratch is shifted rightward from the original SVM hyperplane, and thus the number of cases in which a scratch is erroneously detected as a raindrop is reduced. In this way, it is possible to appropriately determine whether an object is a raindrop according to the glass surface state.

In the present embodiment, the HOG feature value is used for the recognition of a raindrop, and the frequency characteristics are used for the recognition of the glass surface state in view of the characteristics of a raindrop and a glass surface state. That is, the combination of the HOG feature value and the SVM is suitable for the recognition of a raindrop. In contrast, since the external environment and the glass surface state appear as the frequency components, the combination of the FFT having a small calculation cost and the multi-class SVM is used for the recognition of a glass surface state and the external environment.

Next, the rainfall estimating unit 16 will be described. The rainfall estimating unit 16 is configured to acquire the vehicle speed from a vehicle speed sensor 52 of the vehicle. The rainfall estimating unit 16 may be a vehicle speed data acquisition unit. The rainfall estimating unit 16 is configured estimate the rainfall amount based on the vehicle speed and the number and the size of the raindrops determined by the raindrop determining unit 15.

Specifically, the rainfall estimating unit 16 is configured to estimate the volume of the raindrop from the size of the raindrop and the water repellent property of the glass. Then, the rainfall estimating unit 16 calculates the total volume of raindrops per unit time from the number and the volume of the raindrops per the unit time. Then, the rainfall estimating unit 16 calculates the quantity of rain by converting the total volume of raindrops per the unit time to the total volume of raindrops per one hour. When the vehicle is moving, the calculated quantity of rain may be affected by the raindrops adhered to the vehicle as a result of a motion of the vehicle as well as the rainfall. Since the amount of the raindrops adhered as a result of a motion of the vehicle increases with the vehicle speed, it is necessary to correct the calculated quantity of rain based on the vehicle speed to obtain the actual quantity of rain.

Subsequently, the wiper controller 30 and the washer controller 40 coupled with the raindrop recognition device 10 will be described. The wiper controller 30 includes a mode change unit 31. The mode change unit 31 is configured to change a mode of the wiping motion of the wiper 32 based on the rainfall amount estimated by the raindrop recognition device 10. For example, when the rainfall amount is greater than a predetermined threshold, the wiping mode is set to high speed. When the rainfall amount is equal to or less than the predetermined threshold, the wiping mode is set to low speed. When the rainfall amount is equal to or less than a second threshold that is smaller than the predetermined threshold, the wiping mode may be set to an intermittent mode.

The washer controller 40 is configured to control the washer 41 based on the recognition result of the glass surface state determined by the glass surface state recognition unit 19 and the glass surface state correction unit 20. Specifically, when an adhered object other than a raindrop is detected on the glass surface, the washer controller 40 controls the washer 41 to spray the washer fluid, and the wiper controller 30 controls the wiper 32 to wipe off the adhered object. In order to avoid unnecessary spraying by the washer 41 based on the glass surface state, the following configuration may be employed.

For example, in order not to erroneously recognize the unwiped part as dirt, the threshold for detecting dirt may be increased after the washer 41 sprays the washer fluid. A configuration for notifying that it is time to change the rubber of the wiper 32 when the unwiped part remains for long time may be employed. In order not to detect stubborn dirt such as an insect many times, the threshold for detecting dirt may be increased after the washer 41 sprays the washer fluid. Alternatively, the washer 41 may be configured not to spray for a predetermined time after spraying. In order to avoid continuous malfunctions while the glass freezes, it may be determined that the glass is frozen when the outside air temperature is at or below a predetermined threshold.

(Training of Raindrop Recognition Model)

Figure 4:
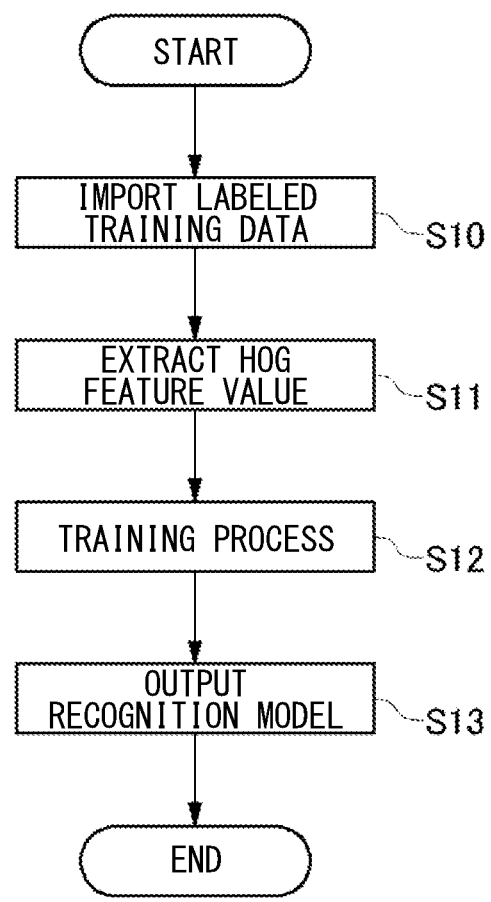
FIG. 4 is a flowchart showing a method of training a raindrop recognition model.

FIG. 4 is a flowchart showing a training process executed by a training device for training the raindrop recognition model. As shown in FIG. 4, the training device takes a bunch of training data each containing an image of a glass surface and a label representing whether a raindrop exists on the glass surface (S10). The training data includes images with uniform background and images with a light source. Since such images may cause erroneous detection of a raindrop, the training data must include such images. Preferably, the training data includes ten or more such images each. The label may contain a level corresponding to an area of a raindrop. The images of the glass surface with uniform background include images at night in which the background is uniformly dark and remains unchanged and images in which it is hard to tell the glass surface from the background. The images with the light source are images in which a part of the background is whiten out by the light source.

Labeling may be attached based on a visual determination by a person or an automatic determination by a discriminator. When the label is automatically determined, images of raindrop are extracted from candidate images of the training data by the discriminator, the area of the raindrops is calculated from the number and the size of the raindrops, and the training data is classified based on the area.

Subsequently, the training device extracts the HOG feature value of the image data of the training data (S11). Then, the training device calculates coefficients of the HOG feature values to be multiplied using the HOG feature value and the label such that the model is configured to discriminate a raindrop from others (S12). The training device outputs the raindrop recognition model generated by the training (S13). The output raindrop recognition model is stored in the raindrop recognition model storage unit 17 of the raindrop recognition device 10.

(Operation of Raindrop Recognition Device)

Figure 5:
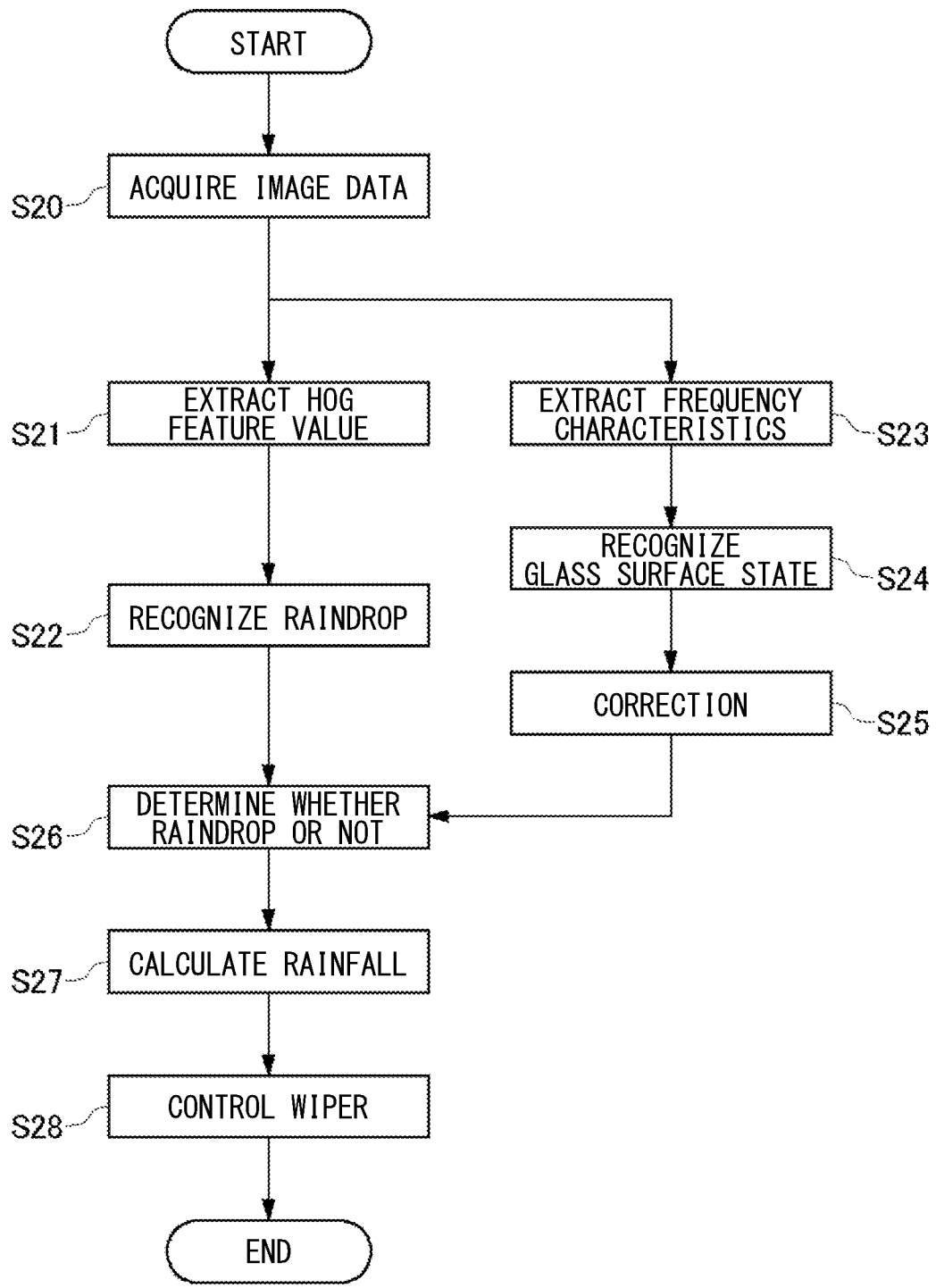
FIG. 5 is a flowchart showing an operation of the raindrop recognition device.

FIG. 5 is a flowchart showing the operation of the raindrop recognition device 10 for recognizing a raindrop. The raindrop recognition device 10 acquires an image data of the windshield taken by the camera 50 (S20). The raindrop recognition device 10 extracts the HOG feature value from the input image data (S21), and obtains the raindrop likeness by inputting the HOG feature value to the raindrop recognition model read from the raindrop recognition model storage unit 17. At the same time as obtaining the raindrop likeness, the raindrop recognition device 10 extracts the frequency characteristics from the input image (S23), recognizes the glass surface state by inputting the frequency characteristics to the state recognition model (S24), and correct the recognized glass surface state (S25).

Next, the raindrop recognition device 10 determines whether an object on the glass surface is a raindrop based on the raindrop likeness and the glass surface state (S26). The raindrop recognition device 10 calculates the rainfall amount based on the size and the number of the raindrops and the vehicle speed (S27), and control the wiper 32 based on the rainfall amount (S28).

The configuration and operation of the raindrop recognition device 10 according to the first embodiment and the method of training the raindrop recognition model used in the raindrop recognition device 10 have been described above. The raindrop recognition model of the raindrop recognition device 10 of the first embodiment is trained by training data including images that may cause erroneous detection such as images with uniform background and images with light source. Accordingly, the erroneous detection of the raindrop and false negative can be reduced. In a general method of detecting adhered objects, a recognition model is used for detecting various adhered objects such as raindrops, snow grains, ice, dust, mud, insects, and feces. Accordingly, it may be difficult to increase the sensitivity in detecting each adhered object with the general method.

Second Embodiment

Figure 6:
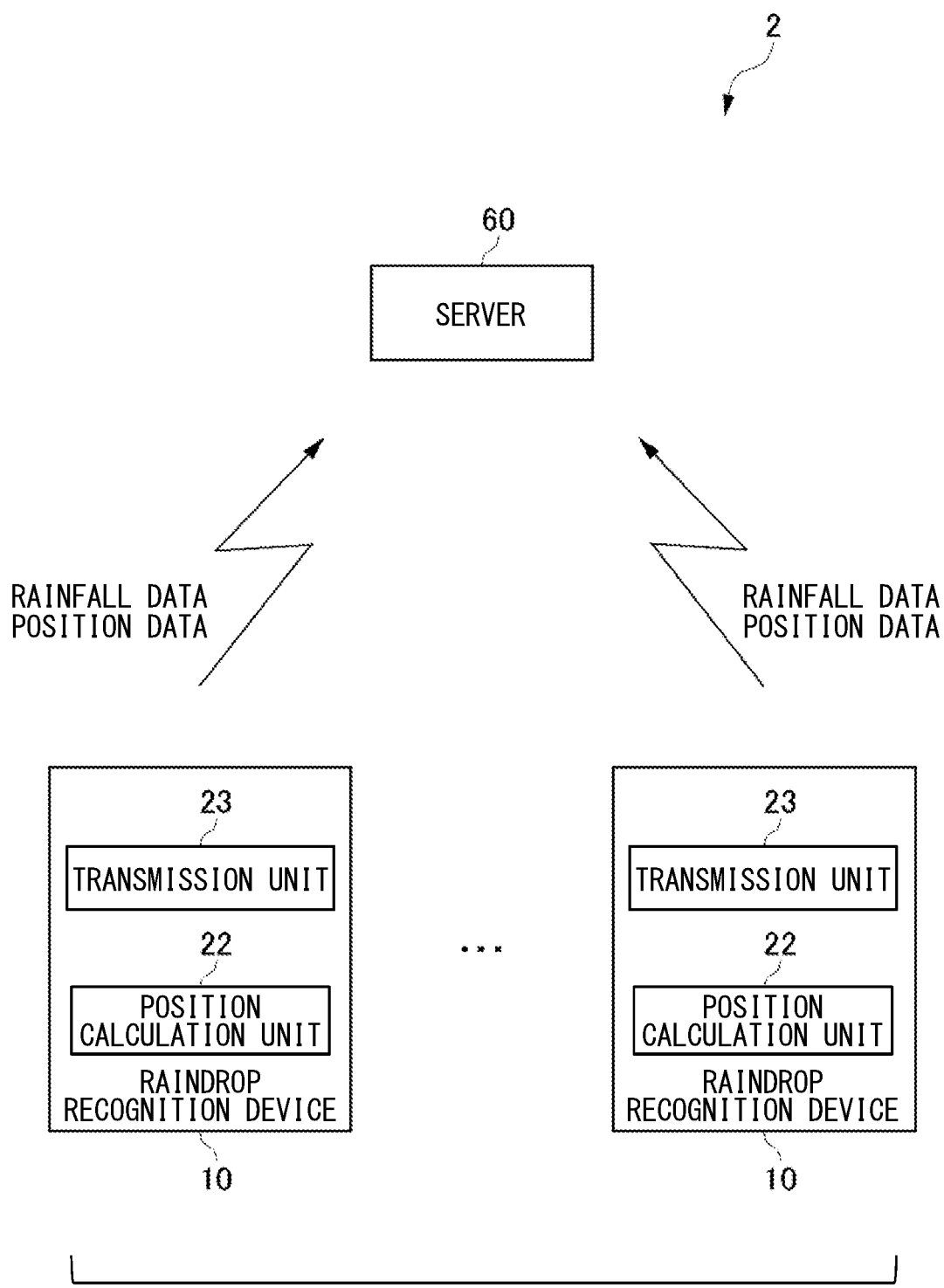
FIG. 6 is a diagram illustrating a rainfall recognition system including multiple raindrop recognition devices.

FIG. 6 is a diagram illustrating a rainfall recognition system 2 including multiple raindrop recognition devices 10. The rainfall recognition system 2 includes multiple raindrop recognition devices 10, and a server 60 configured to collect rainfall data from the raindrop recognition devices 10.

The raindrop recognition device 10 has the configurations explained in the first embodiment and is configured to estimate the rainfall amount from the image of the windshield of a vehicle. The raindrop recognition device 10 of the present embodiment includes a position calculation unit 22 configured to calculate a current position of the raindrop recognition device 10, and a transmission unit 23 configured to transmit the data of the rainfall amount estimated by the raindrop recognition device 10. The position calculation unit 22 is a GPS, for example. The raindrop recognition device 10 is installed in a vehicle. When the vehicle has a position information, the raindrop recognition device 10 may be configured to acquire the position data from the vehicle.

The raindrop recognition device 10 transmits the data of the estimated rainfall amount and the current position to the server 60. Since the server 60 collects the data of the rainfall amount and the position transmitted from multiple raindrop recognition devices 10, the rainfall situation in multiple areas can be grasped, and a weather service can be provided.

Third Embodiment

Figure 7:
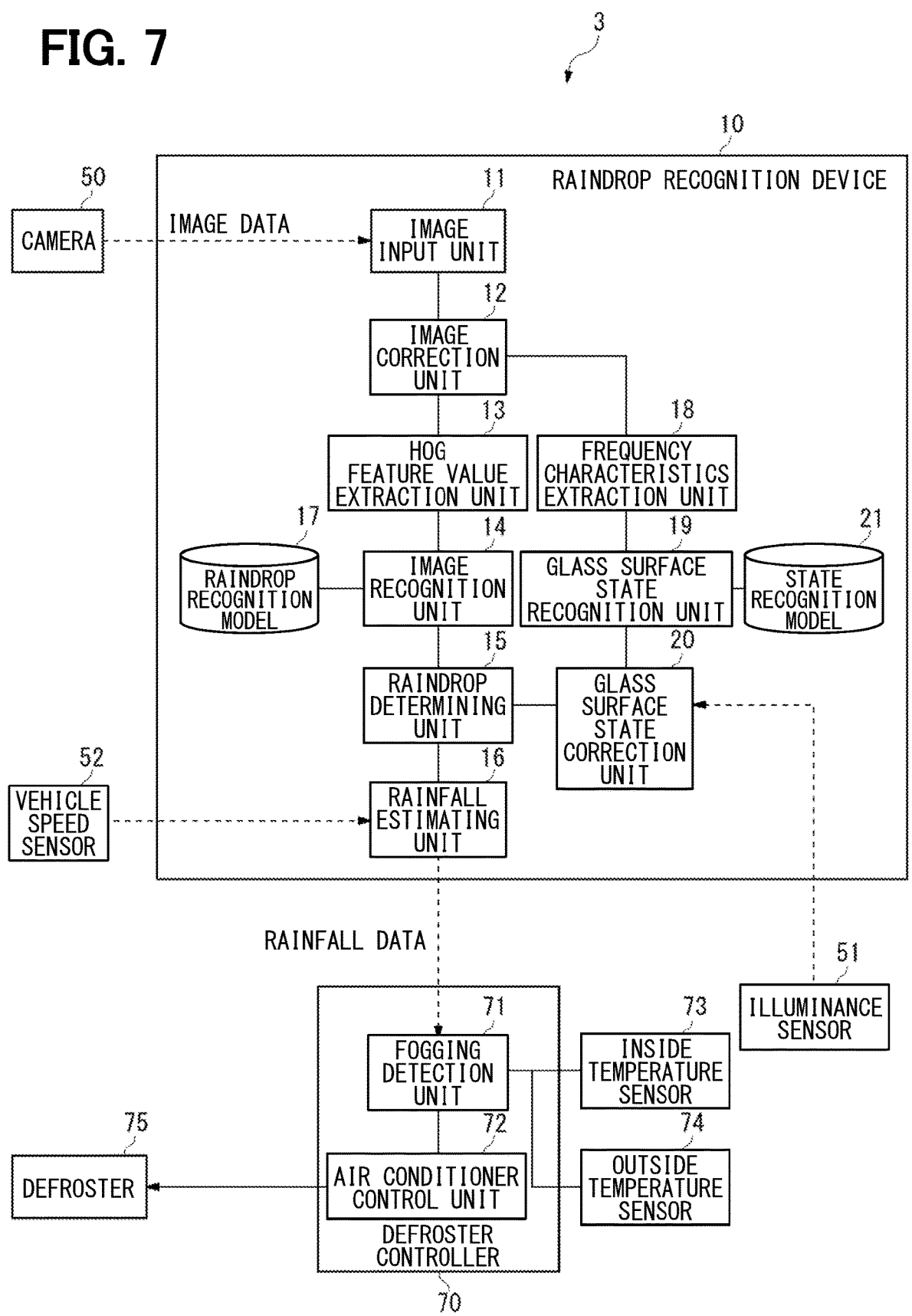
FIG. 7 is a diagram illustrating a vehicular control apparatus including a raindrop recognition device according to a third embodiment.

FIG. 7 is a diagram illustrating a vehicular control apparatus 3 including a raindrop recognition device 10 according to a third embodiment. The configuration of the raindrop recognition device 10 of the third embodiment is the same as the raindrop recognition device 10 of the first embodiment. The vehicular control apparatus 1 of the first embodiment controls the wiper controller 30 and the washer controller 40 based on the rainfall data recognized by the raindrop recognition device 10. In the third embodiment, the vehicular control apparatus 3 controls a defroster controller 70.

The defroster controller 70 includes a fogging detection unit 71 for detecting a fogging of the windshield, an air-conditioner control unit 72 for controlling an air-conditioner to actuate a defroster 75 upon the detection of the fogging. The fogging detection unit 71 is configured to detect the fogging of the windshield based on data of a temperature in the passenger compartment sent from an inside temperature sensor and the outside air temperature sent from the outside air temperature sensor. When the fogging detection unit 71 detects the fogging of the windshield, the air-conditioner control unit 72 actuates the defroster 75, and the detection result of raindrops is rejected even when raindrops are recognized by the raindrop recognition device 10. According to this, the wiper is prevented from being actuated based on an erroneous detection result when the water droplets generated on an inner surface of the windshield due to condensation are erroneously recognized as raindrops.

Fourth Embodiment

A vehicular control apparatus according to a fourth embodiment is configured to recognize a raindrop on the windshield of a vehicle based on an image taken by a camera that captures the front of the vehicle (hereinafter, referred to as front monitoring camera). The front monitoring camera is mounted in the passenger compartment and takes a picture of an outside of the vehicle through the windshield. This camera has a depth of field such that an object distant from the windshield is included in the depth of field in order to capture an image of a vehicle or a pedestrian ahead, for example. Some front monitoring cameras do not include a windshield in their depth of field, and in images captured by such front monitoring camera, raindrops on the windshield may not be in focus. The vehicular control apparatus according to the fourth embodiment has a configuration for detecting raindrops on the windshield using images taken by the front monitoring camera.

Although the present disclosure has been fully described in connection with the preferred embodiments thereof with reference to the accompanying drawings, it is to be noted that various changes and modifications will become apparent to those skilled in the art.

Additional advantages and modifications will readily occur to those skilled in the art. The disclosure in its broader terms is therefore not limited to the specific details, representative apparatus, and illustrative examples shown and described.

Although the basic configuration of the vehicular control apparatus of the fourth embodiment is the same as that of the first embodiment, the raindrop recognition model used in the fourth embodiment is a trained model generated by machine learning using, as training data, images of the windshield taken by the front monitoring camera. The images of the windshield used for training include images of the windshield with raindrops and images of the windshield without raindrops. The training data includes images with uniform background and images with light source.

Since the raindrop recognition model is trained by images of the windshield taken by the front monitoring camera, the raindrops can be recognized from an image that is out of focus on the windshield.

Conventionally, in order to detect a raindrop on the windshield for automatic wiper control or the like, it may be necessary to use a sensor whose detection surface is the surface of the windshield or a camera configured to focus on the windshield surface. Moreover, since such sensor or camera is necessary to be arranged to correspond to the area wiped by the wiper, it may be necessary to arrange the sensor or camera around the rearview mirror so as not to obstruct the driver's view. However, since the number of sensors and cameras arranged around the rearview mirror such as the front monitoring camera has been increased in recent years, the driver's view may be obstructed, or the appearance of the vehicle interior may be spoiled.

According to the vehicular control apparatus of the present embodiment, since the camera whose depth of field includes a subject distant from the windshield is used for detecting the raindrop on the windshield surface, the raindrop detection and actions in response to the raindrop detection such as automatic wiping function in addition to detecting the detection target can be added to the vehicle without additional sensors or cameras for detecting a raindrop.

The configuration described in the fourth embodiment can be applied to the vehicular control apparatuses of the first to third embodiments.

The vehicular control apparatus having the raindrop recognition device of the present disclosure is described with reference to embodiments. However, the raindrop recognition device of the present disclosure is not limited to the above-described embodiments.

The raindrop recognition device of the above-described embodiments may be configured to recognize whether an object on the windshield is a raindrop based on the recognition results by the image recognition unit before and after wiping the windshield with the wiper. When the object is removed by wiping the windshield, it may be determined that the object is a raindrop. When the object is not removed by wiping the windshield, it may be determined that the object is a scratch or dirt.

In the control of the wiper of the vehicular control apparatus 1 described above, the wiper may be controlled based on the situations around the moving vehicle as well as the rainfall data. Specifically, the image data taken by the camera may be analyzed to stop the wiper when an entrance to a tunnel or a building is detected. A general device is configured stop controlling the wiper upon detecting the tunnel by the illuminance sensor. However, in this case, the device may detect that the vehicle is in the tunnel after a time the vehicle actually entered the tunnel, and accordingly it may take time to stop wiper. According to the configuration for detecting the entrance of the tunnel from the image data, the tunnel can be detected before entering the tunnel, and the wiper can be timely stopped.

In the control of the wiper, an exceptional operation for controlling the wiper may be performed in regardless of the rainfall data upon detecting a predetermined event. For example, the wiper motion may be changed as an exceptional operation when the glass surface state recognition unit 19 determines that the glass surface state is in the entire soaked state or dirty state. When there is no exceptional operation, there is a possibility that the wiper 32 does not work and the visibility becomes poor. However, with the exceptional operation, the wiper can be activated to restore the visibility when the entire surface is wet or dirty. The washer fluid may be sprayed and the wiper may be activated upon detecting dirt by the glass state recognition unit. According to this, the dirt can be removed and the visibility can be restored.

In the above-described embodiments, the detection of an object on the windshield is explained. The information about the adhered object (scratches, unwiping and the like) on the windshield may be transmitted to the server. According to this, the server may provide information for repairing the windshield and information for replacing the wiper to a maintenance shop or the like based on the information about the adhered object.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

What is claimed is:

1. A raindrop recognition device configured to recognize a raindrop on a transparent panel, the raindrop recognition device comprising:
    a storage unit storing a trained model that is a machine learning model trained using, as training data, images of the transparent panel with adhered raindrops and images of the transparent panel without adhered raindrops;
    an input unit to which image data of the transparent panel taken by a camera is input; and
    an image recognition unit configured to calculate a value representing a raindrop likeness of an object on the transparent panel in the image data by inputting the image data to the trained model,
    wherein
    the trained model is trained by training data including images of the transparent panel with uniform background and images of the transparent panel with light source, and
    the images of the transparent panel with the light source are images in which a part of a background is whitened out by the light source.

2. The raindrop recognition device according to claim 1, further comprising:
    a raindrop determining unit configured to determine whether a raindrop exists on the transparent panel by comparing a predetermined threshold with the value representing the raindrop likeness of the object on the transparent panel calculated by the image recognition unit.

3. The raindrop recognition device according to claim 2, further comprising:
    a transparent panel state recognition unit configured to detect a soaked state or a dirty state of the transparent panel based on frequency characteristics of the image data, wherein the raindrop determining unit is configured to determine whether the object on the transparent panel is a raindrop based on
the value representing the raindrop likeness of the object on the transparent panel calculated by the image recognition unit, and
the state of the transparent panel detected by the transparent panel state recognition unit.

4. The raindrop recognition device according to claim 3, wherein
the predetermined threshold is changed based on the state of the transparent panel.

5. The raindrop recognition device according to claim 4, wherein
the state of the transparent panel is detected from frequency components of a part of the image data.

6. The raindrop recognition device according to claim 1, further comprising:
a vehicle speed data acquisition unit configured to acquire data of a vehicle speed of a vehicle on which the raindrop recognition device is mounted; and
a rainfall estimating unit configured to estimate a rainfall amount based on
a number and a size of raindrops on the transparent panel recognized by the image recognition unit, and
the data of the vehicle speed acquired by the vehicle speed data acquisition unit.

7. The raindrop recognition device according to claim 6, further comprising:
a position calculation unit configured to calculate a current position of the raindrop recognition device; and
a transmission unit configured to transmit data of the estimated rainfall amount and data of the current position calculated by the position calculation unit.

8. The raindrop recognition device according to claim 1, wherein
the transparent panel is a windshield of a vehicle, and
it is determined whether the object on the transparent panel is a raindrop based on a recognition result before wiping the windshield with a wiper and a recognition result after wiping the windshield with the wiper.

9. A vehicular control apparatus that includes the raindrop recognition device according to claim 1 and is configured to control a vehicle based on a recognition result of a raindrop on a windshield of the vehicle, the vehicular control apparatus comprising:
a wiper controller configured to determine a wiping motion of a wiper based on rainfall amount estimated by the raindrop recognition device.

10. The vehicular control apparatus according to claim 9, wherein
the wiper controller is configured to stop the wiper upon detecting an entrance of a tunnel or a building from the image data.

11. A vehicular control apparatus that includes the raindrop recognition device according to claim 1 and is configured to recognize a raindrop on a windshield of a vehicle, wherein
the storage unit stores the trained model that is a machine learning model trained using, as training data, images of the windshield included in images taken by a camera configured to capture a front of the vehicle through the windshield, and
the image data of the windshield taken by the camera configured to capture the front of the vehicle is input to the input unit.

12. A vehicular control apparatus that includes the raindrop recognition device according to claim 1 and is configured to control a vehicle based on a recognition result of a raindrop on a windshield of the vehicle, the vehicular control apparatus comprising:
an inside temperature sensor configured to detect a temperature of an inside of a passenger compartment;
an outside air temperature sensor configured to detect a temperature of an outside of the passenger compartment; and
a fogging detection unit configured to detect a fogging of the transparent panel based on the recognition result of a raindrop by the raindrop recognition device and the temperatures of the inside and the outside of the passenger compartment.

13. The vehicular control apparatus according to claim 12, further comprising:
a defroster configured to defog the transparent panel based on a detection result by the fogging detection unit.

14. A vehicular control apparatus that includes the raindrop recognition device according to claim 1 and is configured to control a vehicle based on a recognition result of a raindrop on a windshield of the vehicle, the vehicular control apparatus comprising:
a washer configured to wash an object away when the raindrop recognition device detects the object that is not a raindrop.

15. The vehicular control apparatus according to claim 14, further comprising:
a transmission unit configured to transmit information about the object on the transparent panel as maintenance information to a server.

16. A method of training a model for recognizing a raindrop on a transparent panel, the method comprising:
inputting training data each of which containing an image of the transparent panel and a label indicating whether a raindrop is on the transparent panel, the training data including images with uniform background and images with light source; and
training the model by the training data,
wherein the images of the transparent panel with the light source are images in which a part of a background is whitened out by the light source.

17. A non-transitory computer readable medium storing a trained model used in a computer for recognizing a raindrop on a transparent panel from an image of the transparent panel, the trained model having been trained by a method comprising:
inputting training data each of which containing an image of the transparent panel and a label indicating whether a raindrop is on the transparent panel, the training data including images with uniform background and images with light source; and
training the model by the training data,
wherein the images of the transparent panel with the light source are images in which a part of a background is whitened out by the light source.

\* \* \* \* \*